United States Patent
Obukhov

(10) Patent No.: US 9,430,680 B2
(45) Date of Patent: Aug. 30, 2016

(54) TAMPER SENSOR

(71) Applicant: SEAGATE TECHNOLOGY LLC, Cupertino, CA (US)

(72) Inventor: Dmitry Obukhov, San Jose, CA (US)

(73) Assignee: Seagate Technology LLC, Cupertino, CA (US)

(*) Notice: Subject to any disclaimer, the term of this patent is extended or adjusted under 35 U.S.C. 154(b) by 19 days.

(21) Appl. No.: 14/199,761

(22) Filed: Mar. 6, 2014

(65) Prior Publication Data

US 2014/0283146 A1 Sep. 18, 2014

Related U.S. Application Data

(60) Provisional application No. 61/780,980, filed on Mar. 14, 2013.

(51) Int. Cl.
*G06F 21/87* (2013.01)
*G06F 21/78* (2013.01)

(52) U.S. Cl.
CPC ............... *G06F 21/87* (2013.01); *G06F 21/78* (2013.01)

(58) Field of Classification Search
None
See application file for complete search history.

(56) References Cited

U.S. PATENT DOCUMENTS

| 4,378,809 | A * | 4/1983 | Cosman | A61B 5/0002 600/488 |
| 4,620,072 | A * | 10/1986 | Miller | E05F 15/47 200/61.43 |
| 2002/0067885 | A1* | 6/2002 | Hall | G01L 9/0077 385/31 |
| 2002/0141588 | A1* | 10/2002 | Rollins | G06F 21/602 380/277 |
| 2004/0054914 | A1* | 3/2004 | Sullivan | G06F 21/602 713/189 |
| 2009/0261844 | A1* | 10/2009 | Howard | G01D 5/2026 324/655 |
| 2011/0055560 | A1* | 3/2011 | Meissner | G06F 21/602 713/166 |

* cited by examiner

*Primary Examiner* — Jung Kim
*Assistant Examiner* — Adrian Stoica
(74) *Attorney, Agent, or Firm* — Hall Estill Attorneys at Law

(57) ABSTRACT

A deformable tamper sensor and tamper resistant electronic system is operable to detect opening of an enclosure and perform actions responsive to the detection. Movable elements within the tamper sensor are held in position when the sensor is compressed and define a multi-bit sensor value. Transitioning the sensor from a compressed to a non-compressed state non-destructively provides a new sensor value through movement of one or more elements.

17 Claims, 8 Drawing Sheets

TAMPER SENSOR

BACKGROUND

1. Field

Advancements in electronics-enclosure tamper-resistance are needed to provide improvements in data security, product marketability, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Hard disk drives (HDDs) and solid-state drives (SSDs) provide a convenient way to store data. Data storage drives are packaged in an enclosure to restrict dust and debris, to allow mounting in a chassis, or allow easy handing in the case of external drives. Such drives may be employed as system drives installed within a computer, or as external drives. USB powered drives provide easy archival and transport of data. Encrypted data storage, either on the rotating media of a HDD or within memory devices comprising a SSD, reduces the likelihood of unwanted data access in the event of loss or theft of a drive or system. Attacks on data storage drives may comprise gaining access to circuitry providing signals to the storage media, monitoring and analysis of these signals, and determination of an encryption or encoding format such that data might be retrieved.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

LIST OF REFERENCE SYMBOLS IN DRAWINGS

Figure 1A:
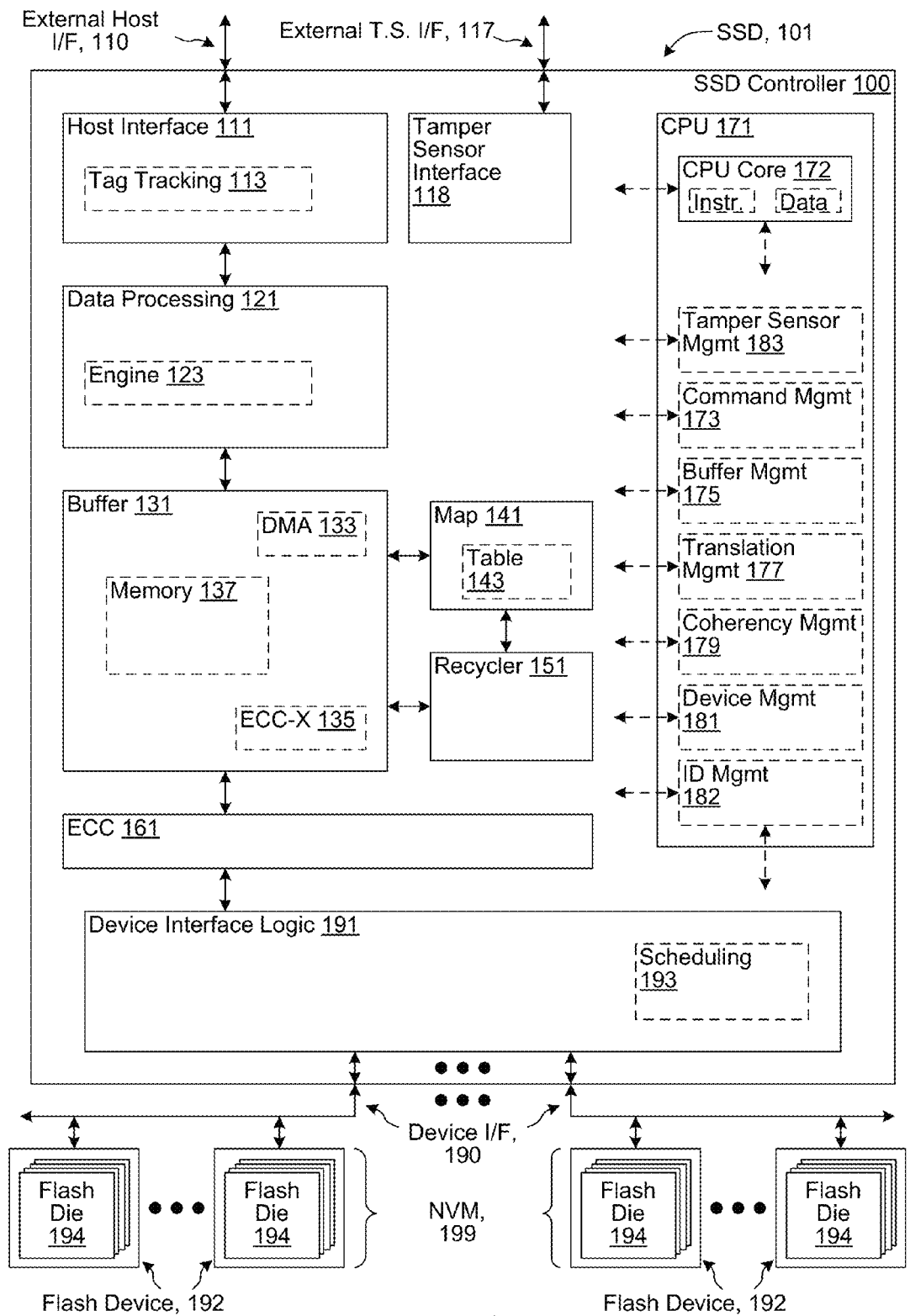
FIG. 1A illustrates, via a block diagram, selected details of an embodiment of a Solid-State Disk (SSD) including an SSD controller compatible with a tamper sensor enabled for detecting tampering with respect to a drive enclosure of the SSD.

| Ref. Symbol | Element Name |
| --- | --- |
| 100 | SSD Controller |
| 101, 101-A | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 108 | Shadow Map |
| 109 | Application (App) |
| 109D | dotted-arrow (Application ←→ I/O Device Communication via driver) |
| 109V | dotted-arrow (Application ←→ I/O Device Communication via VF) |
| 110 | (SSD-Controller) External Host Interface (I/F) |
| 111 | (SSD-Controller Internal) Host Interface |
| 112C | (optional) Card Memory |
| 112H | Host Memory |

-continued

| Ref. Symbol | Element Name |
|---|---|
| 113 | Tag Tracking |
| 114 | (Multi-Device) Management Software (Mgmt SW) |
| 115 | Host Software (SW) |
| 116 | I/O Card |
| 117 | External Tamper Sensor Interface (T.S. I/F) |
| 118 | Tamper Sensor Interface |
| 119 | Circuit Board |
| 120 | External Connector |
| 121 | Data Processing |
| 122 | Controller/Sensor Interface |
| 123 | Engines |
| 130 | Enclosure |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management (Mgmt) |
| 175 | Buffer Management (Mgmt) |
| 177 | Translation Management (Mgmt) |
| 179 | Coherency Management (Mgmt) |
| 180 | Memory Interface (I/F) |
| 181 | Device Management (Mgmt) |
| 182 | Identity Management (ID Mgmt) |
| 183 | Tamper Sensor Management (Mgmt) |
| 190 | Device Interfaces |
| 191 | Device Interface Logic |
| 192 | Flash Device |
| 193 | Scheduling |
| 194 | Flash Die |
| 199 | NVM |
| 210, 210-b,-c,-d | Tamper sensor |
| 312 | First conductors |
| 322, 322-b,-c | Second conductors |
| 330-b,-c | Flexible membrane |
| 340-b,-c | Fluid body |
| 345 | Retaining guide |
| 350-a,-b,-c | Programming element |
| 502 | Illumination source |
| 504 | Detectors |
| 604 | Magnetic detectors |
| 710 | Interface logic |
| 800 | System utilization method |
| 810 | Compress tamper sensor operation |
| 820 | Acquire sensor value operation |
| 830 | Store reference value operation |
| 840 | Acquire sensor value operation |
| 845 | Derive secret key operation |
| 850 | Compare sensor value with reference value operation |
| 860 | Determine value match operation |
| 870 | Allow normal operation operation |
| 880 | Inhibit normal operation operation |
| 890 | Mismatch response operation |
| 900 | Sensor use method |
| 910 | Install sensor operation |
| 920 | Compress sensor operation |
| 930 | Acquire sensor value operation |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Various embodiments provide tamper detection to enable defensive responses to the opening of a storage unit (drive) enclosure. The defensive responses reduce the likelihood of an attacker being able to retrieve data from the storage unit. More specifically, these embodiments inhibit drive operation in response to detecting an enclosure being opened, providing a first defense against monitoring of internal signals. These embodiments also ensure that a potential attacker will not be able to open the enclosure to the drive with the power off, determine the nature of operation of the tamper detection device, and provide alterations that permit normal operation with the enclosure open, thereby enabling monitoring of signals.

Various embodiments provide tamper detection apparatuses and methods of use that cannot be easily defeated if the enclosure is opened. More specifically, various embodiments provide a tamper sensor operable to provide a tamper sensor value of high precision (20 bits or more in some embodiments, as may be applicable to FIPS level 4/Operator Authentication) and of high random variability such that once an enclosure is opened, a potential attacker has a very low probability of providing a correct sensor value that would permit normal system operation. If an incorrect sensor value is provided, a system may erase encryption information, erase or restrict access to a portion of the data, erase stored program code, void a warranty, or take some other action to protect data and/or intellectual property.

Various embodiments provide a randomizing, compression stabilized tamper sensor. Values provided by the sensor may be digital or analog and may be ascertained through electrical, optical, or magnetic detection.

Various embodiments may be employed in a wide range of areas including data storage devices, communications devices including routers, modems, hubs, secure radios and phones. As portable devices such as cell phones, tablets and the like provide functions rivaling laptop and desktop computers, and are increasingly used for business, improved enclosure security is highly desirable. Other areas of use include ATMs, credit card readers, cable/satellite set top boxes, and point of sale (POS) terminals, such as electronic cash registers, for example.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) An electronic system, comprising:
an enclosure means for electronic circuitry; and
deformable tamper detecting means operable to provide a first multi-bit direct digital value when the enclosure is closed, and to non-destructively provide a second different multi-bit digital value after the enclosure is opened.

EC2) The system of EC1, further comprising:
means to alter the operation of the electronic circuitry responsive to the second value being different from the first value.

EC3) The system of EC1, wherein the first multi-bit digital value and the second multi-bit digital value are able to be acquired without use of an analog-to-digital converter and without permanently limiting the range of values that the sensor may produce.

EC4) The system of EC1, wherein the tamper detecting means is operable to provide a third multi-bit digital value different from the first value responsive to the enclosure being again closed.

EC5) The system of EC1, wherein the detecting means provides the first value when in a compressed state.

EC6) The system of EC1, wherein the electronic circuitry comprises a solid state drive controller.

EC7) A tangible computer readable medium having a set of instructions stored therein that when executed by a processing element cause the processing element to perform operations, the operations comprising:
reading a tamper sensor value from at least one deformable tamper sensor operable to provide a multi-bit digital value of at least 16 bits;
comparing the sensor value with a reference value; and
responsive to the comparing and in accordance with predetermined criteria, selectively enabling normal operation of an electronic system and otherwise inhibiting the normal operation.

EC8) The tangible computer readable medium of EC7 wherein the multi-bit digital value is at least 20 bits.

EC9) An apparatus, comprising:
a deformable fluid body containing a fluid within a flexible membrane;
at least one programming element within the fluid;
a plurality of electrical conductors within the fluid body; and
wherein compression of the fluid body results in the at least one programming element coming in electrical contact with at least two conductors of the plurality of electrical conductors.

EC10) The apparatus of EC9, wherein the density of the at least one programming element is substantially the same as the density of the fluid.

EC11) The apparatus of EC9, wherein altering the compression of the fluid body results in the at least one programming element not being in electrical contact with the same at least two conductors of the plurality of electrical conductors.

EC12) A method, comprising:
closing an enclosure containing an electronic device and a deformable tamper sensor so as to non-destructively compress the deformable tamper sensor;
reading a first tamper sensor value from the tamper sensor;
storing information according to the first tamper sensor value within the electronic device; and
reading a second tamper sensor value from the tamper sensor and deviating from normal operation of the electronic in response to a detected change between the stored information and the second tamper sensor value.

EC13) The method of EC12, wherein the tamper sensor is operable to produce a digital sensor value of at least 20 bits.

EC14) The method of EC12, wherein the information comprises an encryption key derived, at least in part, from the first tamper sensor value.

EC15) A tamper sensor, comprising:
a fluid within a deformable fluid body, the fluid operable to flow within the fluid body responsive to a change in shape of the fluid body;
at least one or more programming elements within the fluid; and
wherein the position of the at least one or more programming elements within the fluid body define a sensor value and wherein a respective position of each of the at least one or more programming elements is changeable responsive to the fluid flow.

EC16) The tamper sensor of EC15, wherein the respective positions of the at least one or more programming elements are sensed electrically, optically, magnetically, inductively, or capacitively or by a combination thereof.

EC17) The tamper sensor of EC15, wherein at least one of the at least one or more programming elements substantially allows current flow from a first portion of the surface of the at least one programming element to a second portion of the surface of the at least one programming element, and substantially inhibits current flow from the second portion to the first portion.

EC18) The tamper sensor of EC15, wherein the respective positions of the at least one or more programming elements are maintained when the fluid body is in a compressed state.

EC19) A tamper sensor, comprising:
a plurality of optically or electrically conductive fibers within a deformable fluid body, the fluid body operable to hold the plurality of fibers in fixed positions when in a compressed state;
a fluid within the fluid body operable to flow within the fluid body responsive to a change in shape of the fluid body and operable to move some of the conductive fibers when the fluid body transitions from a compressed state; and sensors or other conductors operable to produce a sensor value dependent upon the positioning of fibers within the fluid body.

EC20) A method, comprising:

applying a compressive force to a deformable body containing one or more movable programming elements within, until the one or more movable programming elements are held in position by portions of the deformable body; and determining a digital value dependent upon the location of the one or more movable programming elements within the deformable body.

EC21) A compression programmable digital register comprising:

a deformable fluid body containing a fluid;

one or more programming elements movable in the fluid body when the deformable body is in a first state and held in respective positions when the deformable body is in a second state; and means detecting the respective positions of the one or more programming elements and providing a digital value according to the respective positions.

EC22) A random number generator, comprising:

a deformable body containing a fluid;

one or more programming elements within the fluid operable to move with flow of the fluid when the deformable body is not in a compressed state and to be held in respective positions when the deformable body is compressed; and one or more sensors or conductors operable to produce a digital value, the value depending upon the respective positions of the one or more programming elements in the deformable body in the compressed state.

EC23) The random number generator of EC22, further comprising:

a retention guide operable to limit movement of the one or more programming elements to a portion of the deformable body.

EC24) A tangible computer readable medium having a set of instructions stored therein that when executed by a processing element causes the processing element to perform operations, the operations comprising:

acquiring a value from a fluid randomizing tamper sensor;

comparing the acquired value with a reference value; and dependent on a result of the comparing, performing tasks of normal operation in accordance with a predefined normal result, and otherwise performing other tasks.

EC25) The tangible computer readable medium of EC24, wherein the other tasks include a secure erase task.

System

FIG. 1A illustrates selected details of an embodiment of SSD 101 including an SSD controller compatible with a tamper sensor enabled for detecting tampering with respect to a drive enclosure of the SSD. The SSD controller is for managing non-volatile storage, such as implemented via NVM elements (e.g., flash memories). SSD Controller 100 is communicatively coupled via External Tamper Sensor Interface 117 to a tamper sensor (illustrated in FIG. 1C).

Figure 1B:
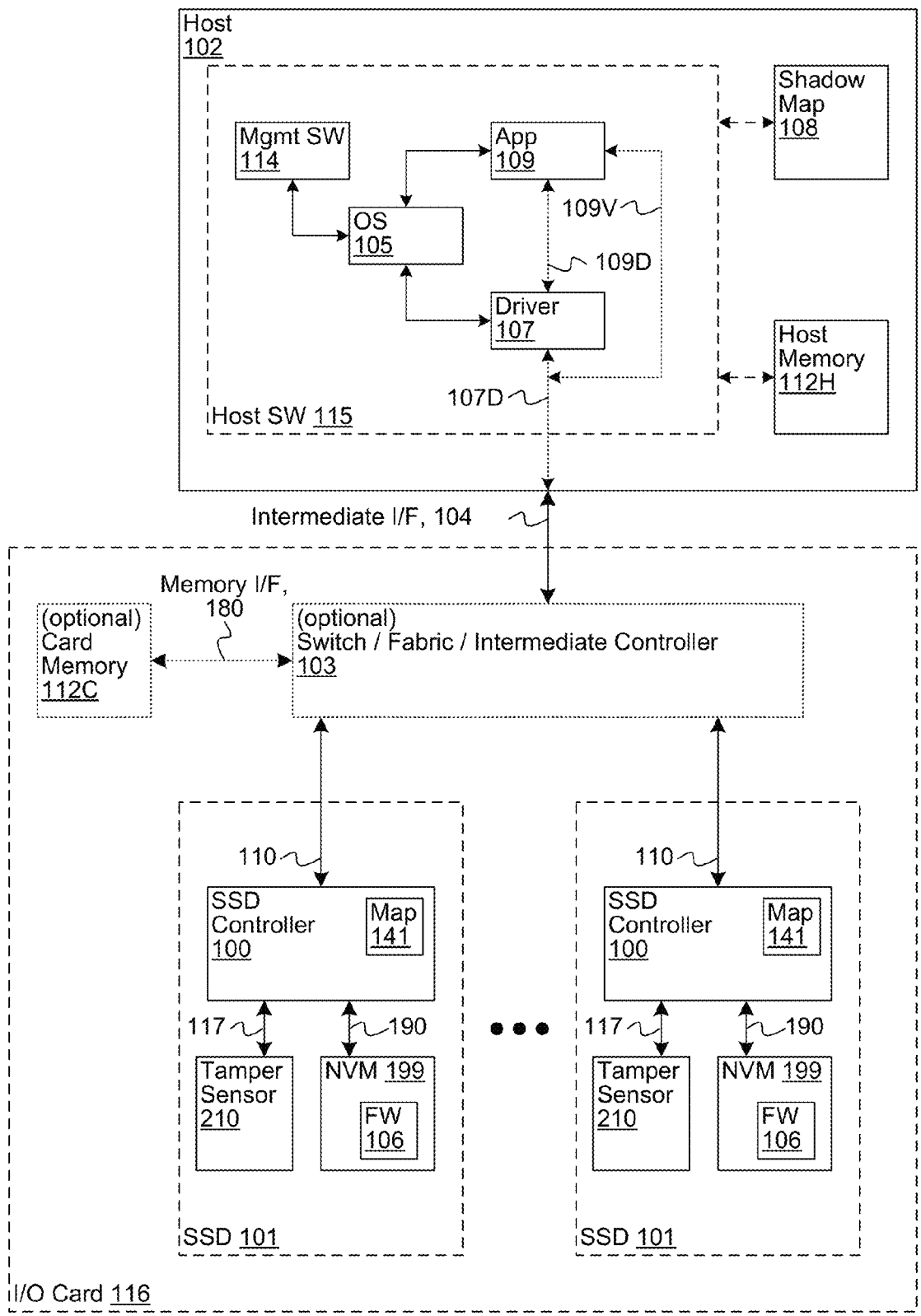
FIG. 1B illustrates, via a block diagram, selected details of various embodiments of systems including one or more instances of the SSD of FIG. 1A.

SSD Controller 100 is further communicatively coupled via one or more External Interfaces 110 to a host (illustrated in FIG. 1B). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, a plurality of Flash Die 194 in the particular Flash Device 192 are optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, Tamper Sensor Interface 118, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a pre-mapped read command specifying a location in NVM 199 and a length and/or a span of data in read unit quanta. For yet another example, the commands include a write command specifying an address (such as an LBA) and an amount of data (such as a number of LBA quanta, e.g., sectors) to write; in response the SSD provides write status and/or requests write data and optionally subsequently provides write status.

For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured to have one or more bands for storing data of different types and/or properties. A number, arrangement, size, and type of the bands is dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded.

CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Tamper Sensor Management 183 to acquire, process, and act upon sensor values provided or derived from a coupled external tamper sensor, and enabling or inhibiting normal operations, or taking other actions, based on the sensor values; Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

FIG. 1B illustrates selected details of various embodiments of systems including one or more instances of the SSD of FIG. 1A. SSD 101 includes SSD Controller 100 coupled to NVM 199 via Device Interfaces 190 and further coupled to Tamper Sensor 210 via External Tamper Sensor Interface 117. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The one or more images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments, Host 102 includes Shadow Map 108 as a distinct hardware resource, while in other embodiments, a shadow map is implemented partially or entirely via Host Memory 11211. Examples of Shadow Map 108, the Host Memory 11211, and Card Memory 112C are one or more volatile and/or NVM elements, such as implemented via DRAM, SRAM, and/or flash devices. Further examples of the host memory are system memory, host main memory, host cache memory, host-accessible memory, and I/O device-accessible memory.

As is described in more detail elsewhere herein, in various embodiments Host 102 and/or one or more of the instances of SSD 101 are enabled to access Shadow Map 108 to save and retrieve all or any portions of mapping information usable to convert LBAs to block and/or page addresses targeting one or more portions of I/O device NVM, such as elements of one or more of the instances of NVM 199. Conceptually the Shadow Map follows (e.g. shadows) information in one or more of the instances of Map 141. Information in the Shadow Map is updated via one or more of Host 102 (e.g. in conjunction with issuing a command to an SSD) and one or more of the instances of SSD 101 (e.g. in conjunction with processing a command from a host). In some embodiments and/or usage scenarios (such as some embodiments having I/O Card 116 and using (optional) Card Memory 112C of FIG. 1B as storage for a shadow map), one or more I/O devices, e.g. SSDs, access the shadow map and a host does not. As is also described in more detail elsewhere herein, in various embodiments, one or more of the instances of SSD 101 are enabled to access Card Memory 112C and/or Host Memory 11211 to save and restore state information internal to the respective SSD instance, such as when entering and exiting a sleep state.

In some embodiments lacking the Switch/Fabric/Intermediate Controller, the SSD is coupled to the host directly via External Interfaces 110. In various embodiments, SSD Controller 100 is coupled to the host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Figure 1C:
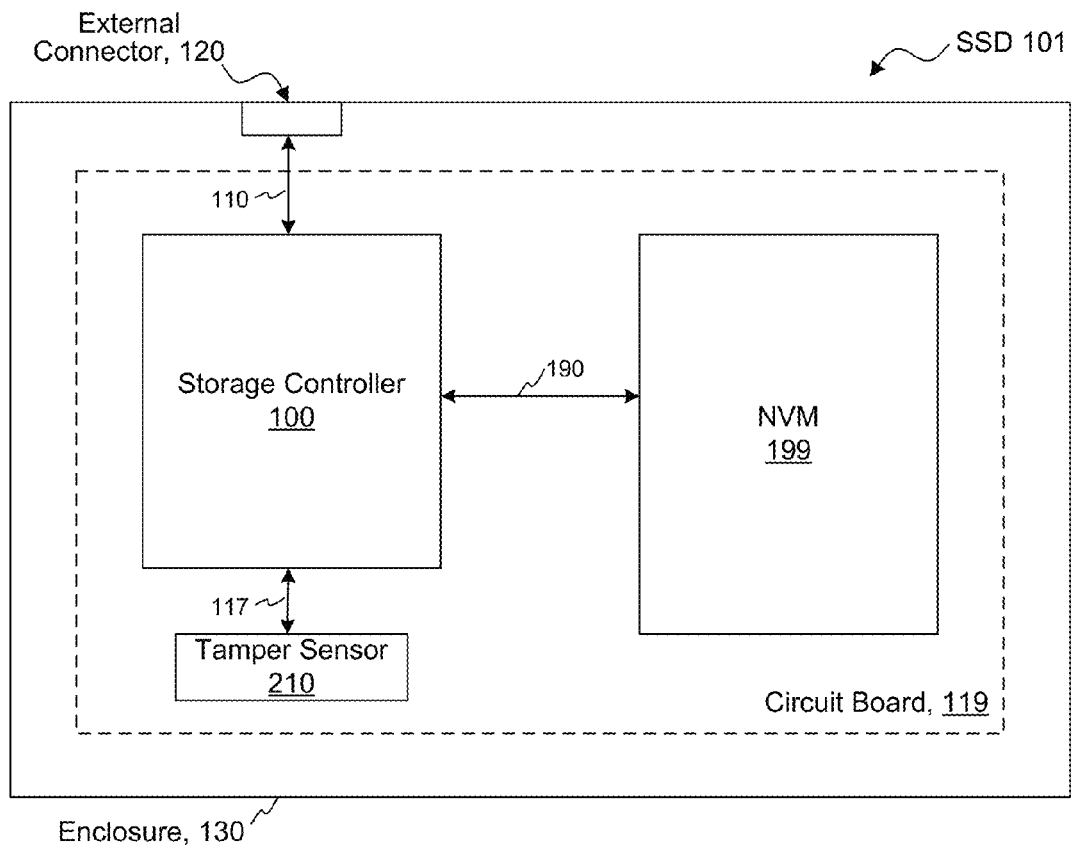
FIG. 1C illustrates, via a block diagram, selected details of an exemplary embodiment of the SSD of FIG. 1A, including a tamper sensor.

FIG. 1C illustrates, via a block diagram, selected details of an exemplary embodiment of the SSD 101 of FIG. 1A, including a tamper sensor 210. SSD 101 comprises an SSD Controller 100, NVM 199, external connector 120, and tamper sensor 210. SSD Controller 100 is coupled to NVM 199 through interface 190. External connector 120 is coupled to SSD Controller 100 by interface 110 that is not limited to any type of signal format and may be USB, ATA, SATA, 1394, PCIe, or any other interface. Tamper sensor 210 is coupled to SSD Controller 100 through interface 117.

SSD Controller 100 is operable to communicate via external connector 120 and to store and retrieve data from NVM 199. Elements of SSD drive unit 101 are disposed on circuit board 119 and are contained within enclosure 130. According to application requirements and embodiment, the SSD and enclosure is that of a 2.5-inch drive, a 3.5-inch drive, and other-sized drive. The SSD may be powered through the external connector 120, such as a USB connector, for example. Data stored in NVM 199 may be encrypted, compressed, or both. Responses to a tamper indication may comprise erasure of a cryptography code or seed value, erasure of data, configuration of SSD Controller 100 to inhibit reading or writing of data, return of false data, restriction of access to a portion of data, inhibiting of data transmission, or any other action.

Figure 2:
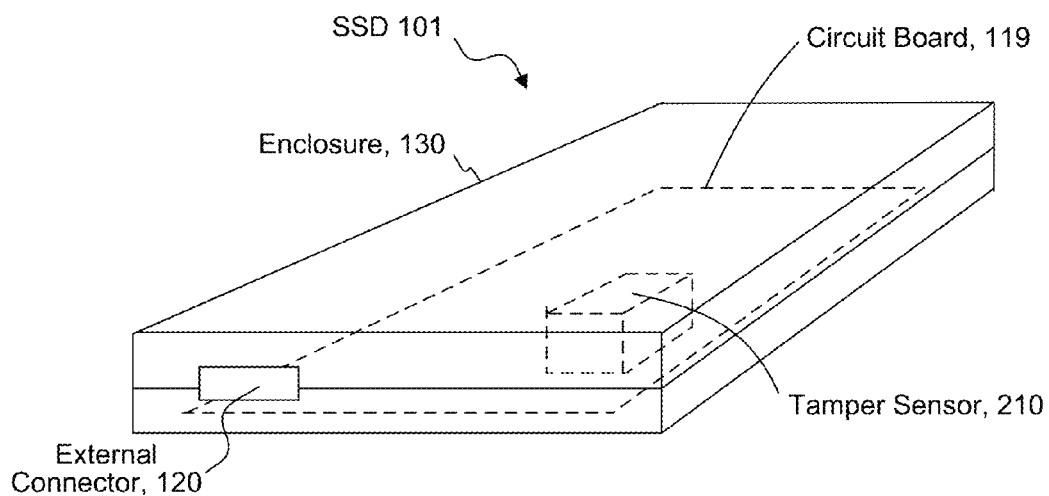
FIG. 2 illustrates, via a perspective view with revealed hidden surfaces, selected details of the SSD enclosure with tamper sensor of FIG. 1C.

FIG. 2 illustrates, via a perspective view with revealed hidden surfaces, selected details of the enclosure 130 with tamper sensor 210 of FIG. 1C. More particularly, tamper sensor 210 is shown disposed on circuit board 119. When enclosure 130 is closed, a compressive force is applied to tamper sensor 210. Tamper sensor 210 may be placed in other areas of enclosure 130 and may be situated on circuit board, chip, enclosure, or other surfaces in any manner such that when enclosure 130 is closed a compressive force is applied to the tamper sensor and when enclosure 130 is opened, the compressive force is reduced or eliminated. Spacers, shims, or the like may be employed such that when enclosure 130 is closed, a compressive force is applied, sufficient to place the tamper sensor in a static condition, as shall be described later. In some embodiments, the placement of tamper sensor 210 within enclosure 130 is such that physical access to tamper sensor 210 is not possible without removing a sufficient percentage of the compressive force such that the static condition is removed. In one example, enclosure 130 has a bottom and a top portion that mate, and where there is a recessed lip on one or the other portion; the height of the lip is such that physical access to the interior of enclosure 130 is only obtainable after the bottom and top portions have been separated to such an extent that the static condition is removed.

In the embodiment of FIG. 1C, the enclosure 130 is of a configuration and size particularly suited for a storage drive and more particularly the SSD 101 of FIG. 1C. However, according to application requirement and embodiment, the enclosure configuration and size are that of a Hard Disk Drive (HDD), a set top box (such as for cable or satellite services), a credit card reader, a point of sale (POS) terminal (such as an electronic cash register), and an ATM.

An Electrical Embodiment

Figure 3A:
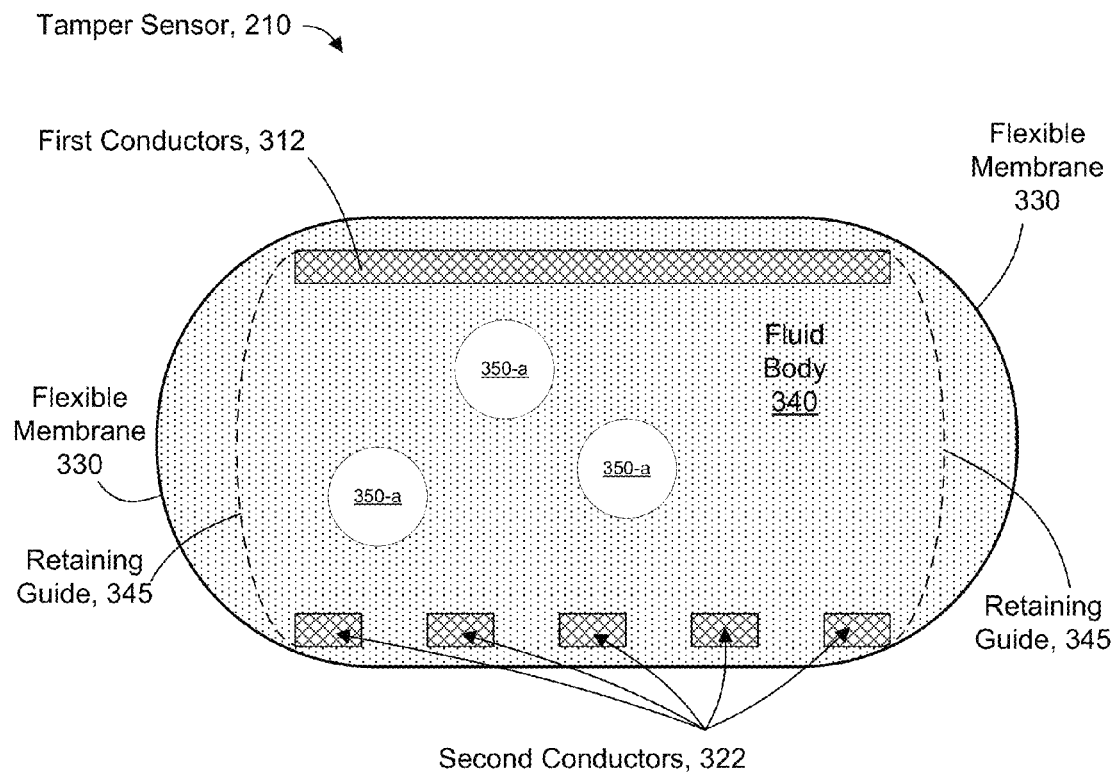
FIG. 3A illustrates, via a sectional view, selected details of an exemplary embodiment of a tamper sensor of FIG. 1C and FIG. 2.

FIG. 3A illustrates selected details of an exemplary embodiment of a deformable tamper sensor. Tamper sensor 210 comprises a fluid body 340 (i.e., a body or collection of fluid) enclosed by flexible membrane 330. One or more movable programming elements 350-a are disposed in a fluid within fluid body 340. The fluid may comprise a non-conductive fluid, such as transformer dielectric oil, for example. While the flexible membrane is shown filled with fluid, the flexible membrane need not be entirely filled. However, there should be sufficient fluid within the flexible membrane such that the programming elements can freely move within the fluid as the fluid body is deformed and the random placement performance of the programming elements is not compromised.

Disposed within Tamper sensor 210 and at least sometimes partially disposed within fluid body 340 are first conductors 312 and second conductors 322. Conductors 312 and 322, the inner surface of membrane 330, and/or a supporting structure may be arranged to define locations where programming elements 350-a may settle when the sensor is compressed. Conductors 312 and 322 may be flexible, or may be rigid, may be mounted on, may be planar to, may be a portion of, or may be recessed in the flexible membrane or a supporting structure (not shown). Programming elements 350-a may be electrically conductive, electrically conductive only from one portion of the element to another, or conductive only in one direction from one portion of the element to another. One or more of the programming elements may be distinguishable from others of the programming elements, for example by having a different electrical property, such as resistance, or a different optical property, such as transparency.

When tamper sensor 210 is in a non-compressed state, programming elements may move within fluid body 340. As enclosure 130 is closed, a compressive force is applied to the sensor and the shape of fluid body 340 is deformed (changed). As the fluid body is deformed, fluid moves from one area of the fluid body to another. Programming elements may substantially move with the fluid. As compression and deformation of the fluid body increases, programming elements are held in position by conductors 312 and 322, and/or by interior surfaces or structures. Programming elements may be deformable or may be substantially rigid.

In some embodiments, the positions of one or more programming elements within the compressed sensor define, at least in part, a sensor value. This value may be analog or digital. In further embodiments, the sensor value is also determined according to the positions of one or more distinguishable ones of the programming elements. In one example, a relative position of one unique one of the programming elements out of n of the programming elements is used to generate a number with approximately log 2(n) bits of information. (The relative position of the unique programming element is determined, in some embodiments, by sensing the positions of the programming elements in a defined order, such as by testing resistance of pairs of conductors in a defined order.) As the number of distinguishable programming elements is increased, up to n/2 of the programming elements, more additional bits of information are obtainable. With 16 programming elements half of which are distinguishable from the other half, 13 additional bits of information are obtainable. With 20 programming elements half of which are distinguishable from the other half, 17 additional bits of information are obtainable.

Some embodiments may comprise retaining guide 345 to limit the position of programming elements to a portion of fluid body 340. Retaining guide 345 may comprise an elastic mesh, pleated mesh, flexible fingers, opposing fingers on two or more surfaces, or any other design, structure, or material limiting movement of programming elements to a portion of the fluid body and allowing movement of fluid. In some embodiments, the retaining guide or other similar structures increase turbulence of the fluid as the tamper sensor is compressed or decompressed. For example, if portions of tamper sensor 210 blocked by retaining guide 345 are taller than portions of tamper sensor 210 containing programming elements 350-a, then in compression relatively more fluid will be pushed into the portions of tamper sensor 210 containing programming elements 350-a, creating more movement of programming elements 350-a than otherwise.

Figure 3B:
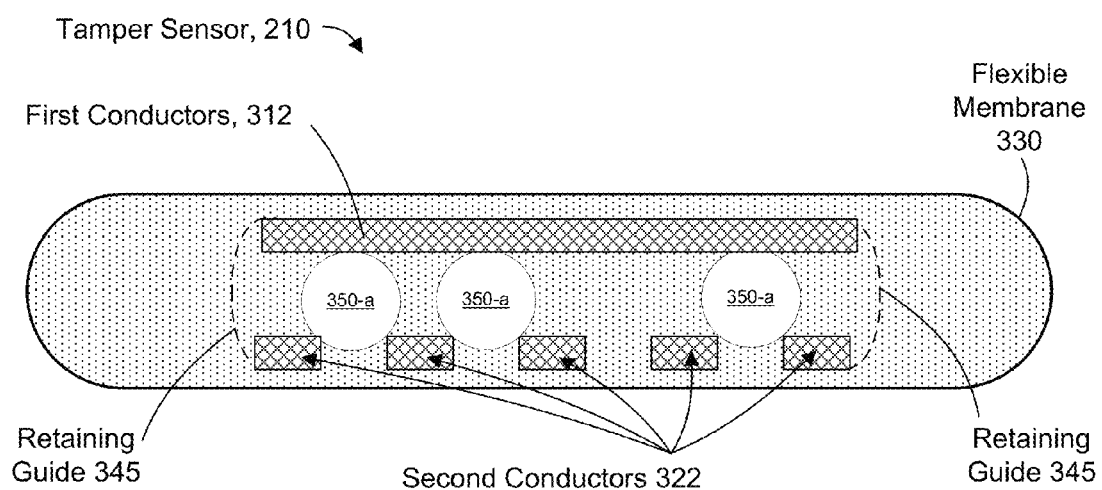
FIG. 3B illustrates, via a sectional view, selected details of the tamper sensor of FIG. 3A in a compressed state.

FIG. 3B illustrates selected details of an exemplary embodiment of a deformable tamper sensor in a compressed state. When compressed, programming elements 350-a may be in communication with one or more first conductors 312 and may be in communication with one or more second conductors 322, such that energy applied to at least one conductor of first conductors 312 is conveyed through a programming element to at least one conductor of second conductors 322, and/or at least another one conductor of first conductors 312. That is, a circuit is completed and "continuity" is achieved with respect to a pair of the first and second conductors. In some embodiments, electrical continuity is measured. In other embodiments, an electrical property such as resistance or inductance is measured.

Figure 4A:
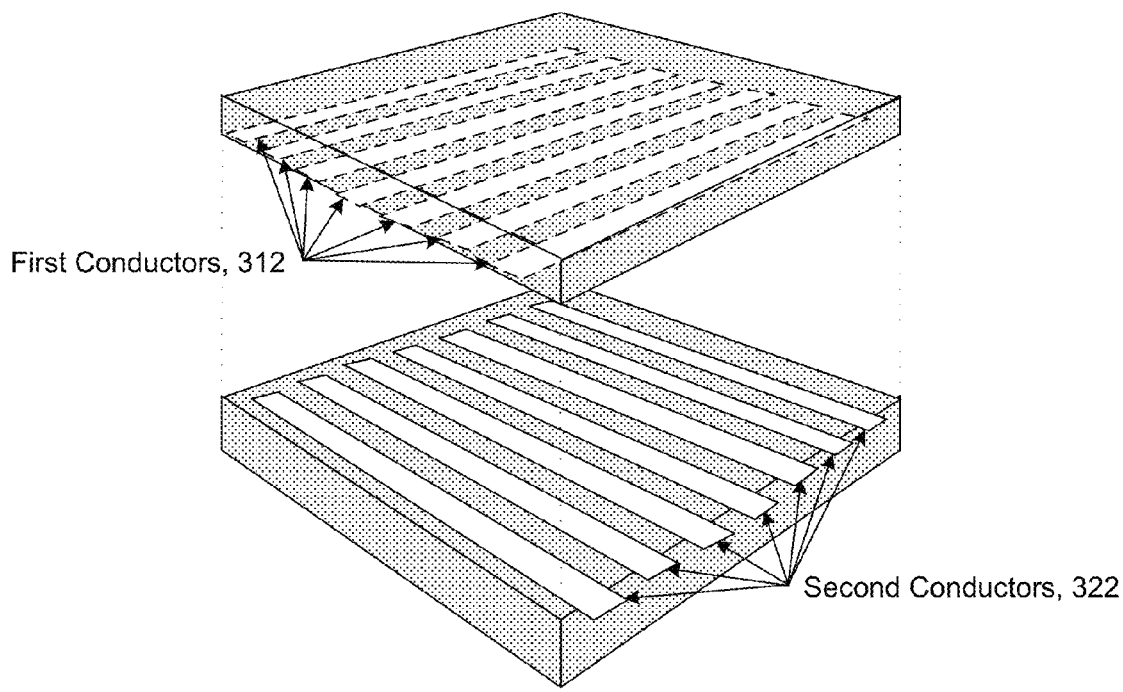
FIG. 4A illustrates, via a perspective view, selected details of an exemplary embodiment of first and second conductors in a grid arrangement.

FIG. 4A illustrates selected details of an exemplary embodiment of first and second conductors in a grid arrangement. A programming element may settle in one of a plurality of channels defined by the first conductors 312 and one of a plurality of channels defined by second conductors 322 such that an array of possible "landing sites" is produced. The distribution of programming elements in the landing sites provides a value that may be read from the conductors. If the first and second conductors are viewed as defining an N×M array, the probability of predicting the array location of a first programming element is 1/(M×N). The probability of a second programming element occupying an array location is 1/((M×N)−1) and the probability of predicting both locations is 1/((M×N)×(M×N(−1))). For example, if three programming elements are placed in a 10×11 array, the probability of predicting the array locations of the three programming elements is 1/(110×109×108) or 1 in 1,294,920. The number of landing sites (array size) and the number of programming elements employed may be selected to produce a desired probability. Alternatively, a plurality of tamper sensors can be employed to produce a desired probability. The collective probability of the plurality of tamper sensors being a function of the number of tamper sensors and their respective probabilities.

Figure 4B:
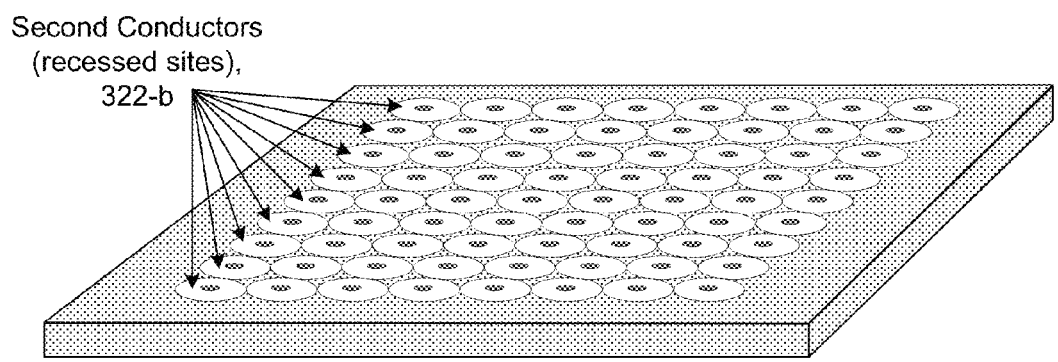
FIG. 4B illustrates, via a perspective view, selected details of an exemplary embodiment of a checkerboard like grid arrangement.

According to other embodiments, membrane 330 or a supporting structure comprises recesses, depressions, dimples or other indentations or protrusions to define landing sites for programming elements when the sensor is compressed. FIG. 4B illustrates selected details of an exemplary embodiment of a checkerboard-like grid arrangement comprising recesses which define landing sites. The membrane 330 or a supporting structure, and/or programming elements, may be of shapes (guides) that result in propagation of (guide) programming elements to landing sites when the sensor is compressed. In one example, the landing sites are hemispherical depressions, and the programming elements are spheres that fit within the hemispherical depressions.

Figure 4C:
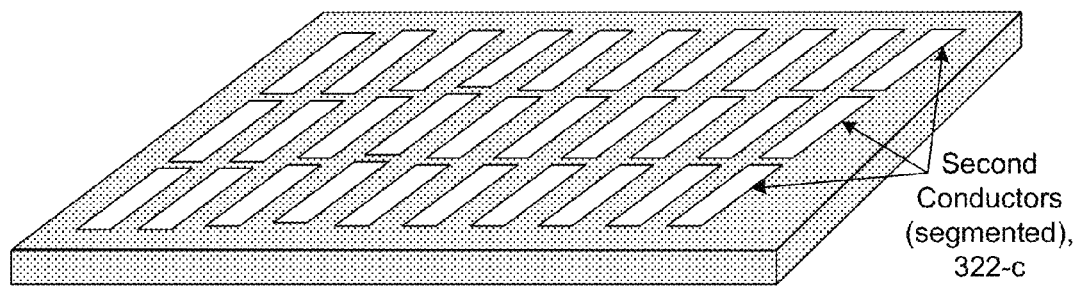
FIG. 4C illustrates, via a perspective view, selected details of an exemplary embodiment of an interleaved segmented conductor arrangement.

In various embodiments, conductors 312 and 322 are not contiguous or physically opposed. More particularly, FIG. 4C illustrates selected details of an exemplary embodiment of an interleaved segmented conductor arrangement. Although FIG. 4C depicts a planar arrangement, segmented arrangements are not limited to such and may be flexible and conformal to fluid body shapes or may be other shapes, such as cylindrical/barrel shaped, for example. While the foregoing has described "landing sites", some embodiments are not limited to such and programming elements settle anywhere in the fluid body when compressed, as allowed by one or more retaining guides, if any.

An Optical Embodiment

Figure 5A:
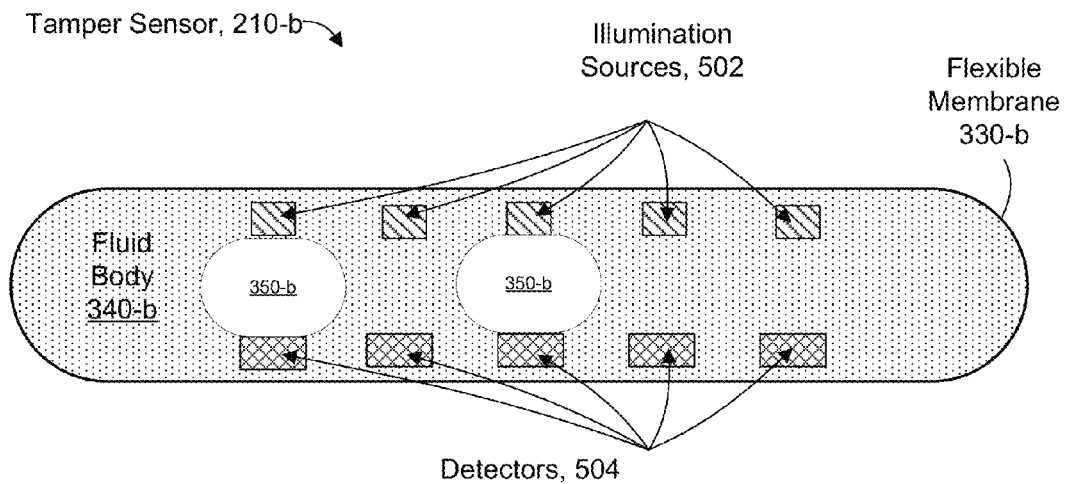
FIG. 5A illustrates, via a sectional view, selected details of an exemplary embodiment of an optical tamper sensor.

FIG. 5A illustrates selected details of an exemplary embodiment of a compressed optical tamper sensor. Tamper sensor 210-*b* comprises fluid body 340-*b* enclosed by a flexible membrane 330-*b* having one or more programming elements 350-*b* within fluid body 340-*b*. One or more illumination sources 502 provide electromagnetic energy (visible light, infrared, ultraviolet, or energy of other wavelengths) that is conditionally detected and/or measured by detectors 504 in dependence upon the position of one or more programming elements 350-*b*. In some embodiments, a light emitting diode (LED) provides illumination through one or more paths. Alternatively, a plurality of LEDs or other illumination sources may be used.

Figure 5B:
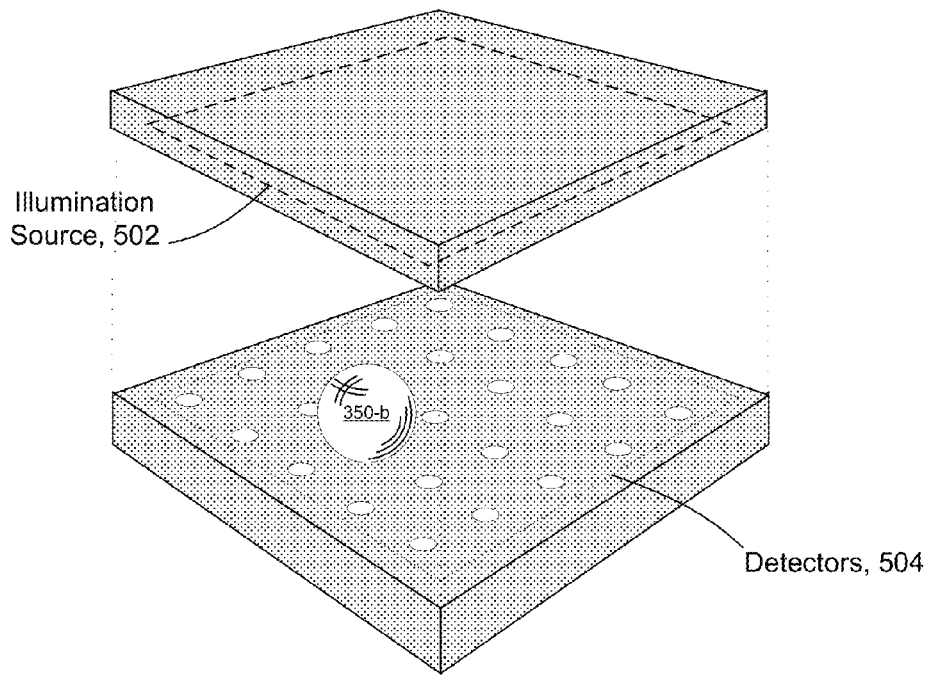
FIG. 5B illustrates, via a perspective view, selected details of an exemplary embodiment of an optical tamper sensor having an array of detectors.

FIG. 5B illustrates selected details of an exemplary embodiment of an optical tamper sensor having an array of detectors. Illumination source 502 may comprise any type of optical emitter including but not limited to one or more LEDs, one or more optical pathways to channel energy to locations, such as opposite detectors, for example, or "global" sources, such as are common to flat panel displays (vacuum florescent, edge lit LED, and the like).

In some optical embodiments, one or more programming elements 350-*b* serve to reduce the energy impinging upon one or more detectors 504. In some embodiments, detectors 504 are operable, either individually or in combination with interface logic, to produce a first logic level when the energy detected is above a threshold and to produce a second logic level when the energy is below the threshold. In other embodiments, the detectors measure an amount of received energy and are further used to distinguish more transparent ones of programming elements 350-*b* from more opaque ones of programming elements 350-*b*. Optical embodiments may employ "landing sites" as previously described to position programming elements to substantially block or substantially allow illumination of detectors. In some embodiments, analog signals may be received from detectors 504 and these signals may be converted to a multiple bit digital format to provide a sensor value.

In some embodiments, programming elements may be optically conductive and serve to direct energy to one or more detectors. In some embodiments, programming elements may concentrate energy, such as lenses, for example. In some embodiments, programming elements may be more optically transparent than fluid within fluid body 340-*b*. In some embodiments programming elements may comprise a deformable sphere containing a transparent gel having opaque or reflective particles in the gel.

A Magnetic Embodiment

Figure 6:
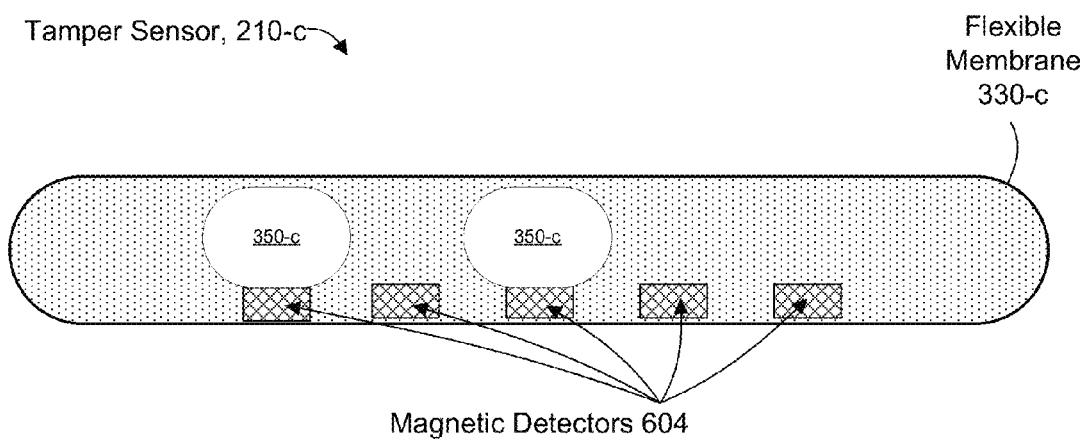
FIG. 6 illustrates, via a sectional view, selected details of an exemplary embodiment of a magnetic tamper sensor.

FIG. 6 illustrates selected details of an exemplary embodiment of a magnetic tamper sensor. Tamper sensor 210-*c* comprises fluid body 340-*c* enclosed by a flexible membrane 330-*c* having one or more programming elements 350-*c* within fluid body 340-*c*. Each of a plurality of magnetic detectors 604 is operable to detect a magnetized programming element when the programming element is in close proximity to the detector.

Other Embodiments

Some embodiments may employ inductive sensors. For example, an LRC circuit may be formed with sensors each having a coil such that the resonant frequency of the LRC circuit reflects the proximity of a programming element to a sensor. Some embodiments may employ capacitive sensors wherein the capacitance of a sensor changes with the proximity of one or more programming elements. Various embodiments may employ any type of sensor operable to indicate presence, proximity, state, type or position of one or more programming elements. Some embodiments may employ brush-like or tentacle-like flexible conductors (electrically conductive fibers or optically conductive fibers, for example) suspended in the fluid in the fluid body that change position responsive to fluid flow and that are held in place when the sensor is compressed, wherein the sensor value depends upon the fiber positions and contact with other conductors or illumination of sensors. Alternatively, some embodiments may employ both programming elements and flexible energy sources wherein the sensor value depends on both the position of the programming elements and of the energy sources. Some embodiments may be operable to detect a loss of fluid in the fluid body. As described previously, some optical embodiments may employ a fluid that is less transparent than the programming elements such that if the fluid is removed, more sensors are illuminated. Capacitive and inductive embodiments may be configured to sense loss of fluid.

Fluid Induced Randomization

Tamper sensor 210 is compressed when enclosure 130 is closed. The fluid body 340 transitions to a non-compressed state when enclosure 130 is opened and the compressive force is removed or reduced. The transition from a compressed state to a non-compressed state results in a change in the shape of the fluid body and produces a flow in the fluid within the fluid body 340. Programming elements may be of a density substantially similar to or alternatively less than that of the fluid within the fluid body such that they are carried along by the fluid and at least some programming elements are displaced from their locations when the sensor was in a compressed state. Programming elements may be both of a substantially similar or alternatively lower density to the fluid and non-magnetic to remove or reduce the biasing of programming element position by gravity or magnetic fields. Alternatively, programming elements may be of differing densities such that effects of buoyancy and gravity combine with the flow of fluid within the fluid body to further randomize the movement of the programming elements. In some embodiments, inactive programming elements having differing electrical, optical or magnetic properties are contained in the fluid body to enhance movement of active programming elements and optionally are of differing density. In some embodiments, a portion of the programming elements having a measurably different property, such as electrical resistance, enable randomization of a value of the tamper sensor even if there is a bias for the programming elements to settle in previously occupied positions. Unless ones of the programming elements with a same property value as in a last compression of the tamper sensor settle in each of the positions, the value of the tamper sensor is changed. Altering the positioning of programming elements through fluid flow when the enclosure is opened provides a very low probability that the same sensor value will be produced while the enclosure is open or if the enclosure is again closed, providing a very high probability of detecting tampering.

Tamper sensor 210 may be configured to produce an "oil can" like effect where, in response to a reduction in a compressive force applied, the tramper sensor may "snap" or change shape rapidly, providing more robust agitation of the fluid within the fluid body and hence movement of the programming elements within, potentially thwarting attacks that open an enclosure very slowly. One portion of the flexible membrane 330 may be more or less flexible than other portions, or may be a different height and thus compress more or less, to promote flow of the fluid in the fluid body when the sensor shape is changed. Tamper sensor 210 may comprise asymmetric shapes of retaining guides, vanes, other surface features and/or spacing between conductors and spacing between conductors and the membrane 330 to enhance displacement of programming elements by a fluid flow. The shape of the sensor may result in a distribution of fluid flow within the fluid body such that some areas may experience a more robust flow than others. Responsive to fluid flow distribution, an initial positioning of programming elements may be selected that is more easily altered and/or less likely to be replicated when a compressive force is reduced and then re-applied as may occur if an enclosure is opened and then closed.

Some embodiments may be termed "direct digital" sensors in that they are operable to directly provide a digital tamper sensor value without the use of analog to digital converters or equivalents thereof. These embodiments include but are not limited to magnetic and "landing site" electrical embodiments. Some of these direct digital sensor embodiments employ scanning, described below, to digitally acquire the sensor value.

Sensor Interfacing and Sensor Value Acquisition

Figure 7:
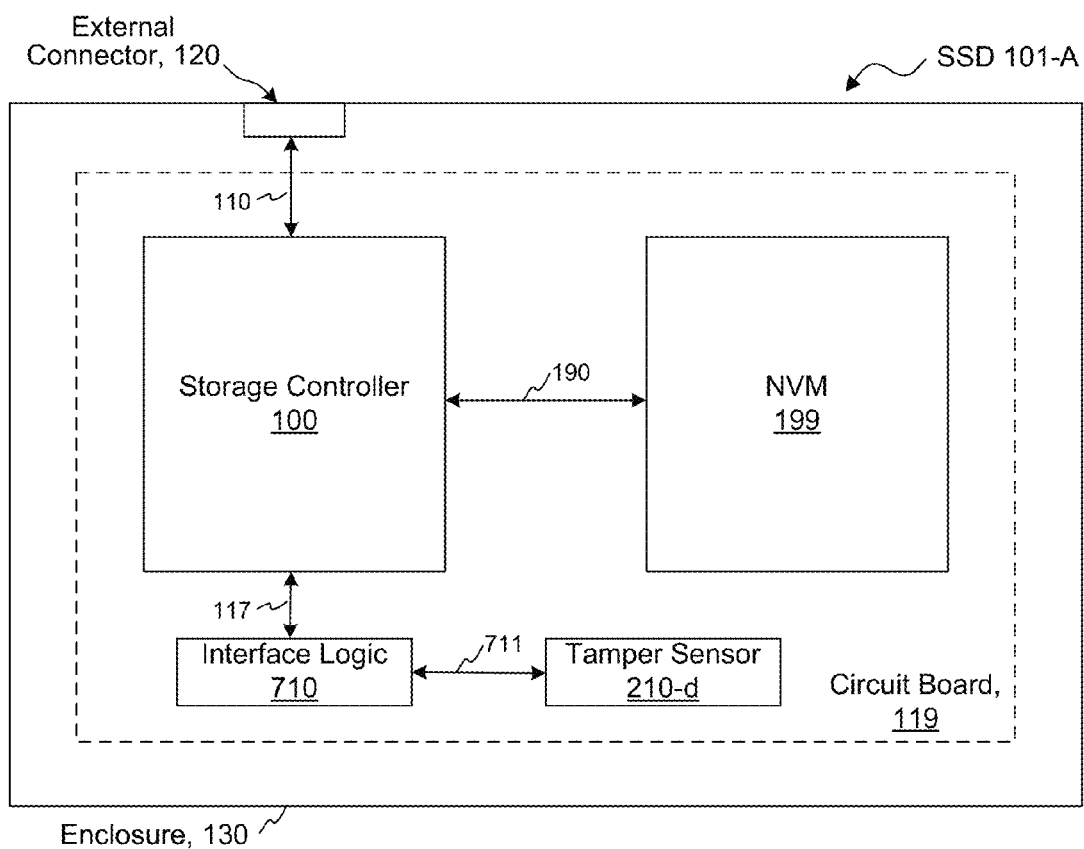
FIG. 7 illustrates, via a block diagram, selected details of an exemplary embodiment of a tamper sensor and interface logic.

Conductors or detectors of the tamper sensor are coupled, either directly or through interface logic, to a controller within the enclosure. FIG. 1 depicts tamper sensor 210 coupled to SSD Controller 100. FIG. 7 depicts tamper sensor 210-$d$ coupled to controller 100 through interface logic 710. In some embodiments SSD Controller 100 comprises interface logic 710.

For some electrical embodiments, energy is selectively applied to one or more first conductors 312 and energy levels on second conductors 322 are acquired to produce a multi-bit sensor value. In some embodiments, acquisition of the sensor value may employ scanning techniques where energy may be selectively applied to one conductor of a plurality of conductors and energy levels read from other conductors, and then applying energy to a different conductor and reading energy levels from other non-energized conductors. The application of energy and the reading of energy from conductors or detectors may take the form of a bidirectional scan as shown by the code example below.

```
// V to H
For (i=0; i<NV; i++)
{
    V[i].type = OUT;
    V[i].value = 1;
    For (j=0; j<NH; j++)
    {
        H[j].type = IN;
        BitV[i*NH+j] = H[j].value;
    }
    V[i].value = 0;
}
// H to V
For (i=0; i<NH; i++)
{
    H[i].type = OUT;
    H[i].value = 1;
    For (j=0; j<NV; j++)
    {
        V[j].type = IN;
        BitH[i*NH+j] = V[j].value;
    }
    H[i].value = 0;
}
// Determine result
Bit = F(BitH, BitV);
```

Some embodiments may employ a scan controller such as the STMPE2401 from STMicroelectronics that provides scanning with information provided to a controller through an I2C interface.

In some embodiments, values obtained in scanning are binary, indicating presence or absence of a programming element at a given scan position. In other embodiments, values obtained in scanning are non-binary and indicate a measure property of a programming element at a given scan position, if any. In one example, if resistance is measured, values obtained in scanning may be trinary, indicating infinite resistance (no programming element), low resistance (a low resistance one of the programming elements), or high resistance (a high resistance one of the programming elements).

For optical embodiments, one or more illumination sources is activated and signals from detectors 504 are received to produce a multi-bit sensor value. The controller and/or interface logic may be operable to selectively activate one or more illumination sources. For magnetic embodiments, the controller and/or interface logic is operable to read digital values from sensors 604. For inductive or capacitive embodiments, interface logic is operable to ascertain if a programming element is in proximity to inductive sensors, and optionally a magnitude of capacitance of the programming element for embodiments in which selected ones of the programming elements have a measurably different capacitance.

System Operation

Figure 8:
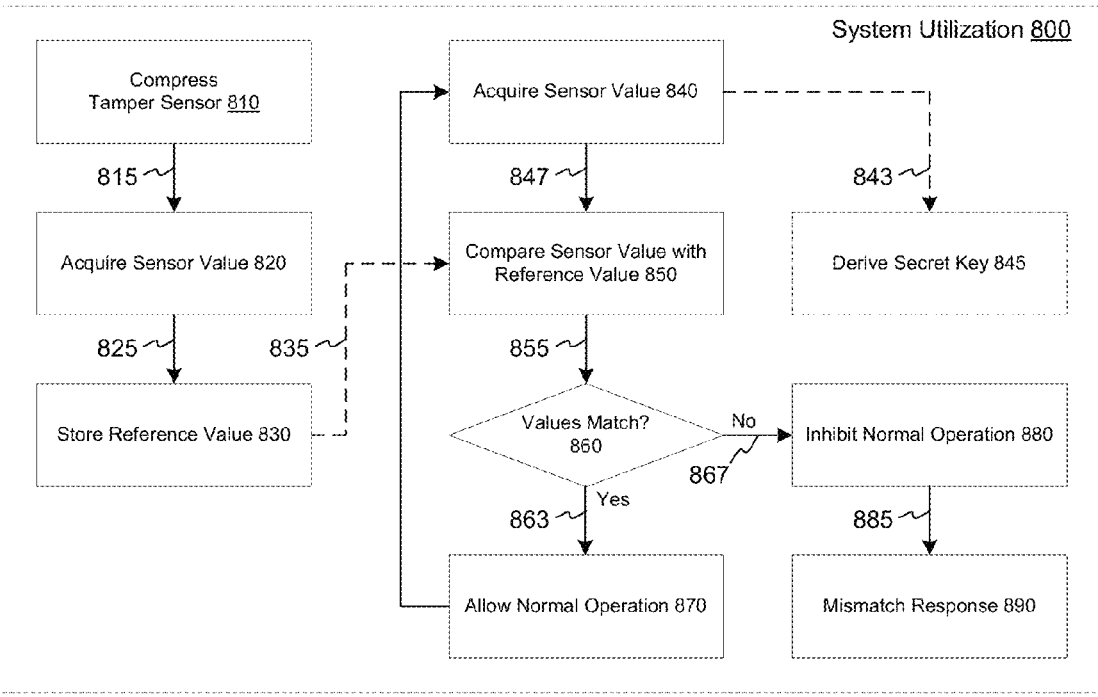
FIG. 8 illustrates, via a flow chart, selected details of an exemplary embodiment of a procedure for using a tamper sensor in a system.

FIG. 8 illustrates selected details of an exemplary embodiment of using a tamper sensor in a system. After assembly of components within an enclosure is complete, the enclosure is closed at operation 810, compressing the tamper sensor. At operation 820 a tamper sensor value is acquired. At operation 830, the acquired value, or a value derived from the acquired value such as a hash function of the acquired value or such as an encryption key, is stored as a reference value. Operations 810-830 may be performed as part of manufacturing a product. Operations 840-880 may occur during testing or customer usage of a product. At operation 840, the sensor value is acquired. This may be in response to power-up, activation, reset, initialization, time intervals, a security-checking command, or some other condition. At operation 850 the acquired sensor value, or a value derived therefrom, is compared with the reference value. At operation 860 if the acquired value, or value derived therefrom, matches the reference value, normal operation continues at operation 870. At operation 860 if the acquired value, or value derived therefrom, does not match the reference value, normal operation is inhibited at operation 880. At operation 890, actions responsive to detecting a mismatch in the acquired/derived value and the reference value may be taken. These actions may comprise erasure of data, zeroing of critical security parameters, erasure of cryptographic information such as keys, restriction of access to a portion of memory or a subset of functions provided by the product in normal operation, request for entry of additional information such as passwords, supplying of false or dummy data, or any other action. In some implementations, the reference value may be stored external to the enclosure, such as may be realized where a data storage device is coupled to a system, such that the storage device or other device is essentially only operable with the system. Various embodiments may implement operations depicted in FIG. 8 in a different order. For example, operation 880 may be performed first and normal operation inhibited until operations 840-860 are performed and a matching acquired value and reference value detected.

Some embodiments may employ the acquired sensor value, either in part and/or in combination with a stored value or a value received across an external interface to derive one or more secret keys. This may correspond to a key derivation function (KDF) and may employ a pseudo random function, such as a hash function, for example. At operation 845, a secret key may be derived. Operation 845 may be performed in an order different from that depicted, such as after a match between the acquired sensor value and the reference value is detected, for example.

In some embodiments, such as a data storage device, operations 810-830 are not performed, and there is no stored reference value. The secret key derived in operation 845 is used as part of encryption of data stored by the storage device and decryption of data retrieved from the storage device. Any tampering with the device such that the tamper sensor is decompressed will change the value of the derived secret key, rendering contents of the storage device inaccessible.

Sensor Operation Detail

Figure 9:
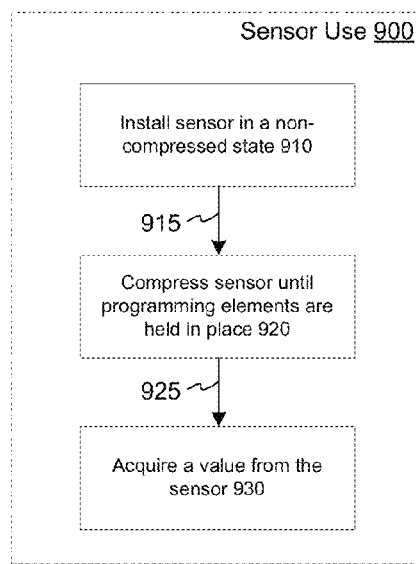
FIG. 9 illustrates, via a flow chart, selected details of an exemplary embodiment of a procedure for using a tamper sensor.

FIG. 9 illustrates further selected details of an exemplary embodiment of using a tamper sensor. At operation 910 (not previously illustrated), an embodiment of the sensor is installed in an enclosure in a non-compressed state and programming elements may move within the fluid body in response to movement of the fluid, gravity, and buoyancy. At operation 920 (corresponding to operation 810 of FIG. 8, but with additional detail) the sensor is compressed, creating fluid flow and movement of programming elements until held in place by the fluid body or internal structures or conductors. At operation 930 (corresponding to operation 820 or operation 840 of FIG. 8) a sensor value is acquired from the sensors.

Obscuring of Sensor Operation

Attackers may attempt to discern tamper sensor values without opening an enclosure. Some embodiments may be employed in combination with various techniques to obscure sensor values and/or the nature of sensor operation. An XRAY barrier may be employed to obscure programming-element positions. Additionally, programming elements may be selected from a group of materials having an XRAY transparency similar to that of the fluid in fluid body 340. Programming elements may have different measurable properties, such as resistance or capacitance or transparency, that are not discernable by XRAY inspection. A wire mesh barrier or other material may be employed to thwart attack attempts using drills, probes, or the like, wherein wire in the mesh barrier may be physically altered (broken or shorted). Electrically conductive shielding materials may be employed to thwart magnetic attacks where an attacker may use a magnet to attempt to hold programming elements in place while the enclosure is opened. Programming elements may be of a non-magnetic material. Thermal barriers may be employed to thwart thermal imaging of the tamper sensor. Some embodiments may employ a combination of sensing methods, such as electrical and optical, for example, where optical sensing may be used to provide a portion of the sensor value and/or to determine if fluid has been removed or possibly altered.

The term randomized has been used to describe some embodiments. Random means that values do not follow a definite pattern. The term optical has been used to describe some embodiments. Optical refers to a range of electromagnetic radiation/energy including visible, infrared, and ultraviolet light and is not limiting to any wavelength or range of wavelengths. Various embodiments provide a tamper sensor operable to randomize a sensor value when an enclosure is opened, or opened and again closed, without use of a battery or other power source. Production of different values by sensor embodiments is non-destructive in that no conductive paths are permanently altered, as may occur if conductive paths are shorted or broken. This allows the sensor to be re-used after completion of repairs or maintenance of circuitry within an enclosure, without reducing the number of bits of resolution of the sensor.

Example Implementation Techniques

In some embodiments, various combinations of all or portions of operations performed by interface circuitry (such as interface logic 710 of FIG. 7), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a controller (such as described relative to FIG. 8), are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java. VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as array sizes, number of conductors and/or detectors depicted, for example), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A sensor, comprising:
   a deformable housing enabling the sensor to transition between a compressed state and a non-compressed state in response to externally applied force; and
   one or more programming elements movably contained within the housing, the programming elements configured to change position responsive to the sensor transitioning from the compressed state to the non-compressed state, the position of the programming elements held in a fixed position defining, at least in part, a sensor value responsive to the sensor transitioning to the compressed state, the sensor value comprising a multi-bit value that changes each time the sensor is transitioned from the non-compressed state to the compressed state, the one or more internal programming elements immersed in a fluid within a flexible fluid body and moveable to contact different combinations of electrical contacts each time the sensor is transitioned from the non-compressed state to the compressed state to output a different corresponding sensor value in response thereto.

2. The sensor of claim 1, wherein the sensor value is determined by one or more transducer assemblies respectively operating electrically, optically, magnetically, capacitively, or inductively.

3. The sensor of claim 1, wherein the sensor value is at least 16 bits in length and the sensor is provided in combination with an encryption key generator which generates an encryption key responsive to the sensor value generated in response to a selected transitioning of the sensor from the non-compressed state to the compressed state and a control circuit which encrypts data stored in a memory associated with the sensor using the encryption key.

4. The sensor of claim 1, wherein the programming elements are one or more of electrically conductive, optically opaque, optically conductive, magnetized, or magnetic.

5. The sensor of claim 1, wherein energy transfer from at least one energy source to at least one energy receiver is conditionally enabled by the one or more programming elements.

6. The sensor of claim 3, further comprising a readback circuit which grants or denies access to the data encrypted by the encryption key responsive to detection in a change of the sensor value from the sensor.

7. A method, comprising:
applying a compressive force to compress a housing in which is disposed one or more moveable programmable elements;
holding the programming elements in a fixed position via the compressed housing, the housing enabling movement of the programming elements in an absence of the compressive force and enabling arrangement of the programming elements in at least one other, different fixed position upon subsequent application of the compressive force thereon, the housing enclosing a fluid which flows responsive to the compressive force applied to the housing, the fluid displacing the programmable elements so as to contact a different set of electrical contacts each time the housing is transitioned from an uncompressed state to a compressed state over a succession of compression intervals;
converting the fixed position into an electrical signal having a first value, the at least one other, different fixed position providing a different, second value;
acquiring a multi-bit sensor value corresponding to the first value;
processing data responsive to the multi-bit sensor value; and
transferring the data processed responsive to the multi-bit sensor value to a host device responsive to a determination that the programming elements are maintained in the fixed position via the compressed housing.

8. The method of claim 7, wherein the multi-bit sensor value is at least 20 bits in length.

9. The method of claim 7, wherein the acquiring comprises determining a relative magnitude of the electrical signal and converting the relative magnitude to the multi-bit sensor value, the method further comprising generating an encryption key responsive to the multi-bit sensor value and encrypting data stored in a memory using the encryption key.

10. A tamper sensor comprising:
a fluid within a deformable fluid body, the fluid operable to flow within the fluid body responsive to a change in shape of the fluid body;
at least one or more programming elements within the fluid, the fluid configured to displace the at least one or more programmable elements so as to contact a different set of electrical contacts each time the fluid body is transitioned from an uncompressed state to a compressed state over a succession of compression intervals, the positioning of the at least one or more programming elements within the fluid body defining, at least in part, a multi-bit digital sensor value and the position of the at least one or more programming elements changeable responsive to the fluid flow, the at least one or more programming elements defining a different multi-bit digital sensor value responsive to different occurrences of the change in shape of the fluid body.

11. The tamper sensor of claim 10, wherein the programming elements are held in position to define a selected multi-bit digital sensor value when the tamper sensor is in a compressed state.

12. The tamper sensor of claim 11, in combination with an encryption key generation circuit which generates an encryption key responsive to the selected multi-bit digital sensor value and a data processing circuit which encrypts data stored in a memory responsive to the encryption key.

13. A sensor comprising:
a deformable fluid body housing a fluid within a flexible membrane; and
at least one programming element disposed within the flexible membrane in contact with the fluid, the programming element moveable between a first position responsive to an absence of an applied compressive force to the housing and a second position responsive to a presence of an applied compressive force to the housing, the programming element outputting a programming value responsive to movement of the programming element to the second position, the programming element outputting a different programming value over each of a succession of transitions between the absence of an applied compressive force to the housing and the presence of the applied compressive force to the housing; and
a plurality of electrical conductors against which the programming element contactingly engages to output the programming value responsive to the movement of the programming element to the second position, the programming element configured to contact a first set of said plurality of electrical conductors during application of an initial applied compressive force to the flexible membrane and to contact a different, second set of said plurality of electrical conductors during application of a subsequent applied compressive force to the flexible membrane after removal of the initial applied compressive force.

14. The sensor of claim 13, in combination with a key generation circuit which derives an encryption key responsive to the programming value output by the programming element.

15. The sensor of claim 14, further in combination with a storage controller circuit which controls access to data storage in a memory responsive to the encryption key.

16. The sensor of claim 14, wherein the storage controller circuit operates to encrypt data stored in the memory using the encryption key.

17. The sensor of claim 16, wherein the storage controller circuit further operates to decrypt the encrypted data in the memory responsive to the programming value being maintained by the sensor.

* * * * *